United States Patent
Shaffer et al.

(10) Patent No.: US 7,684,434 B2
(45) Date of Patent: Mar. 23, 2010

(54) SYSTEM AND METHOD FOR PROVIDING A PRESENCE BASED CAMP-ON FEATURE IN A COMMUNICATIONS ENVIRONMENT

(75) Inventors: Shmuel Shaffer, Palo Alto, CA (US); Labhesh Patel, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 900 days.

(21) Appl. No.: 11/120,912

(22) Filed: May 3, 2005

(65) Prior Publication Data

US 2006/0268698 A1 Nov. 30, 2006

(51) Int. Cl.
*H04L 12/66* (2006.01)
*H04M 3/42* (2006.01)

(52) U.S. Cl. .............. 370/463; 370/465; 379/201.1; 379/142.07

(58) Field of Classification Search .......... 370/351, 370/352, 463–467, 469, 229–232, 252, 253, 370/389, 400, 401, 412, 413, 415, 417; 379/90.01, 379/142.01, 142.04, 142.07, 142.1, 142.15, 379/142.17, 201.01, 201.06, 201.07, 201.08, 379/201.1
See application file for complete search history.

(56) References Cited

U.S. PATENT DOCUMENTS

| | | | | |
|---|---|---|---|---|
| 5,577,111 A * | 11/1996 | Iida et al. | | 379/209.01 |
| 6,118,861 A * | 9/2000 | Gutzmann et al. | | 379/201.01 |
| RE37,073 E * | 2/2001 | Hammond | | 379/67.1 |
| 6,389,127 B1 * | 5/2002 | Vardi et al. | | 379/209.01 |
| 6,477,374 B1 * | 11/2002 | Shaffer et al. | | 455/445 |
| 6,601,099 B1 | 7/2003 | Corneliussen | | 709/224 |
| 6,614,899 B1 | 9/2003 | Sollee et al. | | 379/218.01 |
| 6,615,236 B2 | 9/2003 | Donovan et al. | | 709/203 |
| 6,625,141 B1 | 9/2003 | Glitho et al. | | 370/352 |
| 6,636,594 B1 | 10/2003 | Oran | | 379/201.01 |
| 6,658,095 B1 | 12/2003 | Yoakum et al. | | 379/93.01 |
| 6,661,799 B1 | 12/2003 | Molitor | | 370/401 |
| 6,665,723 B2 | 12/2003 | Trossen | | 709/227 |
| 6,678,735 B1 | 1/2004 | Orton et al. | | 709/230 |
| 6,684,147 B2 | 1/2004 | Park et al. | | 701/71 |
| 6,731,625 B1 | 5/2004 | Eastep et al. | | 370/352 |
| 6,738,390 B1 | 5/2004 | Xu et al. | | 370/467 |
| 6,754,181 B1 | 6/2004 | Elliott et al. | | 370/252 |
| 6,785,246 B2 | 8/2004 | Foti | | 370/261 |
| 6,788,676 B2 | 9/2004 | Partanen et al. | | 370/352 |
| 6,810,260 B1 * | 10/2004 | Morales | | 455/460 |
| 6,970,547 B2 * | 11/2005 | Andrews et al. | | 379/210.01 |
| 7,076,043 B2 * | 7/2006 | Curbow et al. | | 379/201.06 |
| 7,123,706 B2 * | 10/2006 | Ooki | | 379/211.02 |
| 2004/0165713 A1 * | 8/2004 | Leighton | | 379/225 |
| 2007/0124427 A1 * | 5/2007 | Light et al. | | 709/218 |

* cited by examiner

*Primary Examiner*—Aung S Moe
*Assistant Examiner*—Kerri M Rose
(74) *Attorney, Agent, or Firm*—Baker Botts L.L.P.

(57) ABSTRACT

A method for facilitating a data session in a communications environment is provided that includes initiating, by a first endpoint, a call that is intended for a second endpoint. The method also includes invoking, by the first endpoint, an eCamp-On™ feature in response to the second endpoint being unavailable. The eCamp-On™ feature initiates a new call between the first and second endpoints once the second endpoint is available. Presence data associated with the first endpoint may be leveraged in order to make the new call.

45 Claims, 3 Drawing Sheets

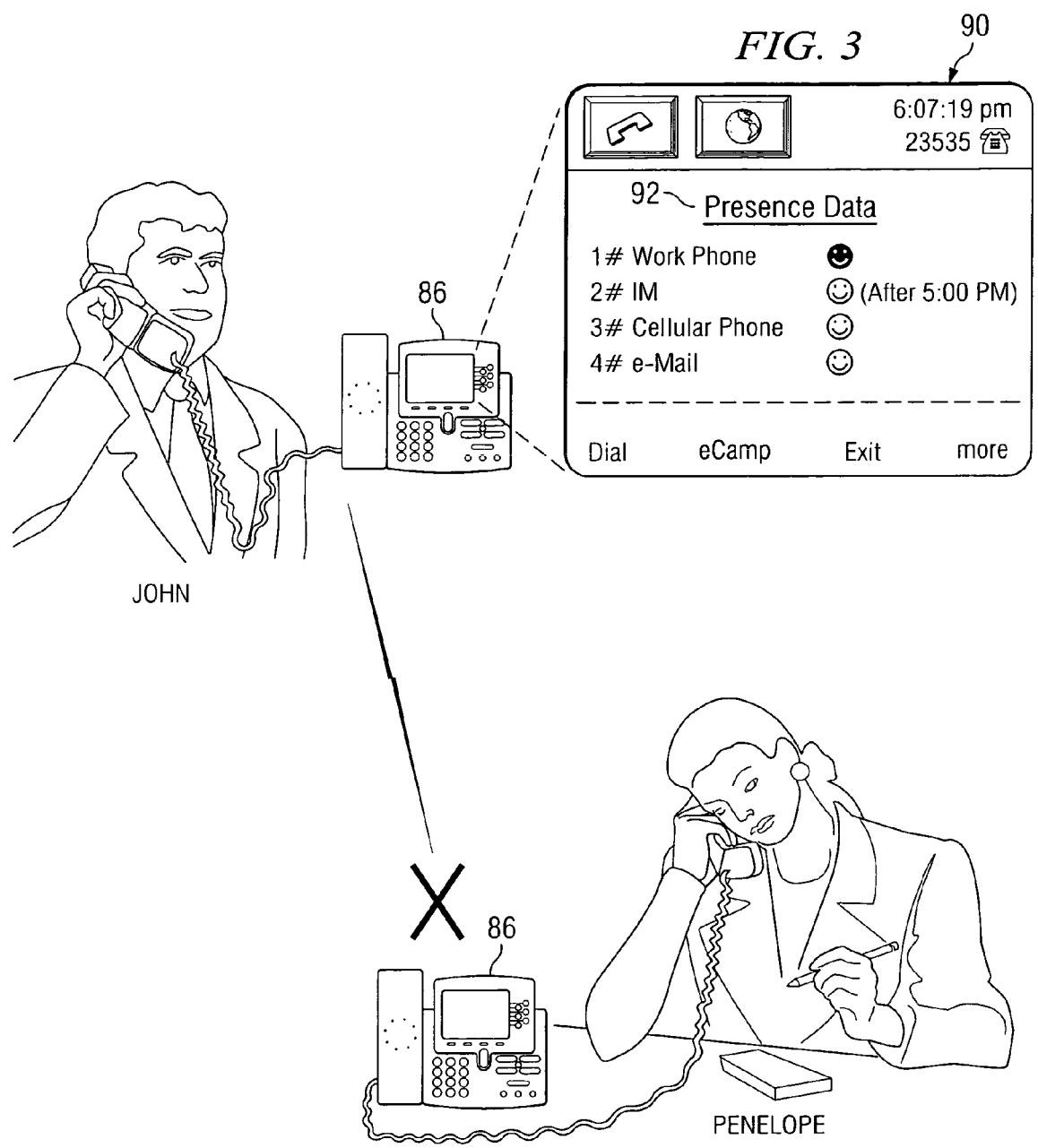

SYSTEM AND METHOD FOR PROVIDING A PRESENCE BASED CAMP-ON FEATURE IN A COMMUNICATIONS ENVIRONMENT

TECHNICAL FIELD OF THE INVENTION

This invention relates generally to communications and, more particularly, to a system and a method for providing a presence based eCamp-On™ feature in a communications environment.

BACKGROUND OF THE INVENTION

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies (e.g. Instant Messaging, cellular communications, simple voice sessions, etc.) that exist in the current marketplace.

As new communication platforms (such as session initiation protocol (SIP), for example) become available to the consumer, new protocols need to be developed in order to optimize this emerging technology. For example, one problem often encountered by a caller in any communications environment is being unable to reach a callee because the callee is not available. The called party may be unavailable for the call for any number of reasons. For example, the called party may be out of the office, on another line, e-mailing another party, preparing a document, talking on their cellular telephone, etc. The calling party is generally oblivious to this information, as he has no idea how to effectively contact this person. In some situations where the callee is busy, the caller can leave a simple voicemail or send them an e-mail (i.e. facilitate the phone-tag scenario). However, in some instances, a live discussion is necessary, whereby an interactive session should be accommodated.

This lack of knowledge and lack of interaction wastes valuable time, frustrates both parties, causes delays in communications, and inhibits productivity. Accordingly, this problem is a burden for any employee, employer, individual, or endpoint that seeks to execute a successful and productive communication session.

eCamp-On™ is generally a private branch exchange (PBX) feature. In an eCamp-On™ scenario, a calling party calls the called party whose phone is busy. The calling party then camps on the called party's phone and is called back when the (busy) called party phone becomes available. Cellular and Internet Protocol (IP) phones provide the user with a means of obtaining the number of callers whose calls have been missed. The called party can search the directory, select a number, and place a call. Thus, existing eCamp-On™ mechanisms use a rudimentary "phone" paradigm, whereby the phone of the calling party is camped-on the phone of the called party. Lacking in such an environment is a feature that allows the calling party to eCamp-On™ the generic persona of the called party (i.e. an individual himself, as opposed to the eCamp-On™ functionality being device-centric).

SUMMARY OF THE INVENTION

From the foregoing, it may be appreciated by those skilled in the art that a need has arisen for an improved presence based eCamp-On™ process that provides an effective solution for participants in a communications architecture. In accordance with an embodiment of the present invention, a system and a method for initiating and establishing an optimal call via any number of end-user devices is provided that substantially eliminate or greatly reduce disadvantages and problems associated with conventional communication strategies and protocols.

According to an embodiment of the present invention, a method for facilitating a data session in a communications environment is provided that includes initiating, by a first endpoint, a call that is intended for a second endpoint. The method also includes invoking, by the first endpoint, an eCamp-On™ feature in response to the second endpoint being unavailable. The eCamp-On™ feature initiates a new call between the first and second endpoints once the second endpoint is available. Presence data associated with the first endpoint may be leveraged in order to make the new call. In more particular embodiments the presence data is user configurable. In still other embodiments, the presence data is collected, aggregated, and utilized autonomously by (for example) a communications platform.

Certain embodiments of the present invention may provide a number of technical advantages. For example, according to one embodiment of the present invention, an architecture and a process are provided that offer a presence based eCamp-On™ feature and a mechanism for which it can be invoked. The present invention introduces the concept of camping-on by a user regardless of the device the calling party opts to use. In essence, the configuration provides a caller with a means of transferring the eCamp-On™ feature from, for example, his office phone to any other communication device. Such an arrangement utilizes current (potentially real-time) presence information to allow the user to transfer the eCamp-On™ to another device on which he has his presence established. This further allows the most recent presence information (and transitions in presence information) to be used to transfer an eCamp-On™ from an originating phone to any other phone.

The proffered architecture can also avoid time-consuming endeavors that inhibit productivity. The proverbial "phone-tag" scenario is effectively avoided by the present invention because the return call is most likely to succeed. Moreover, in cases where the end user has left his current site (or has switched to a different device), the change in device can readily be accommodated. Also, in the context of a business environment, the presence based eCamp-On™ feature yields a significant improvement in efficiency parameters, as important calls can be quickly returned to an optimal destination for the calling party. Additionally, such a protocol may be performed with minimal individual effort from the callee, as such a presence based eCamp-On™ feature may be invoked via a hardware button, via a menu selection, or executed autonomously (e.g. in cases where the end user has preconfigured his device preferences).

Certain embodiments of the present invention may enjoy some, all, or none of these advantages. Other technical advantages may be readily apparent to one skilled in the art from the following figures, description, and claims.

BRIEF DESCRIPTION OF THE FIGURES

To provide a more complete understanding of the present invention and features and advantages thereof, reference is made to the following description, taken in conjunction with the accompanying figures, wherein like reference numerals represent like parts, in which:

FIG. 3 is a simplified block diagram illustrating an example operational flow of the communication system of FIG. 1.

DETAILED DESCRIPTION OF THE INVENTION

Figure 1:
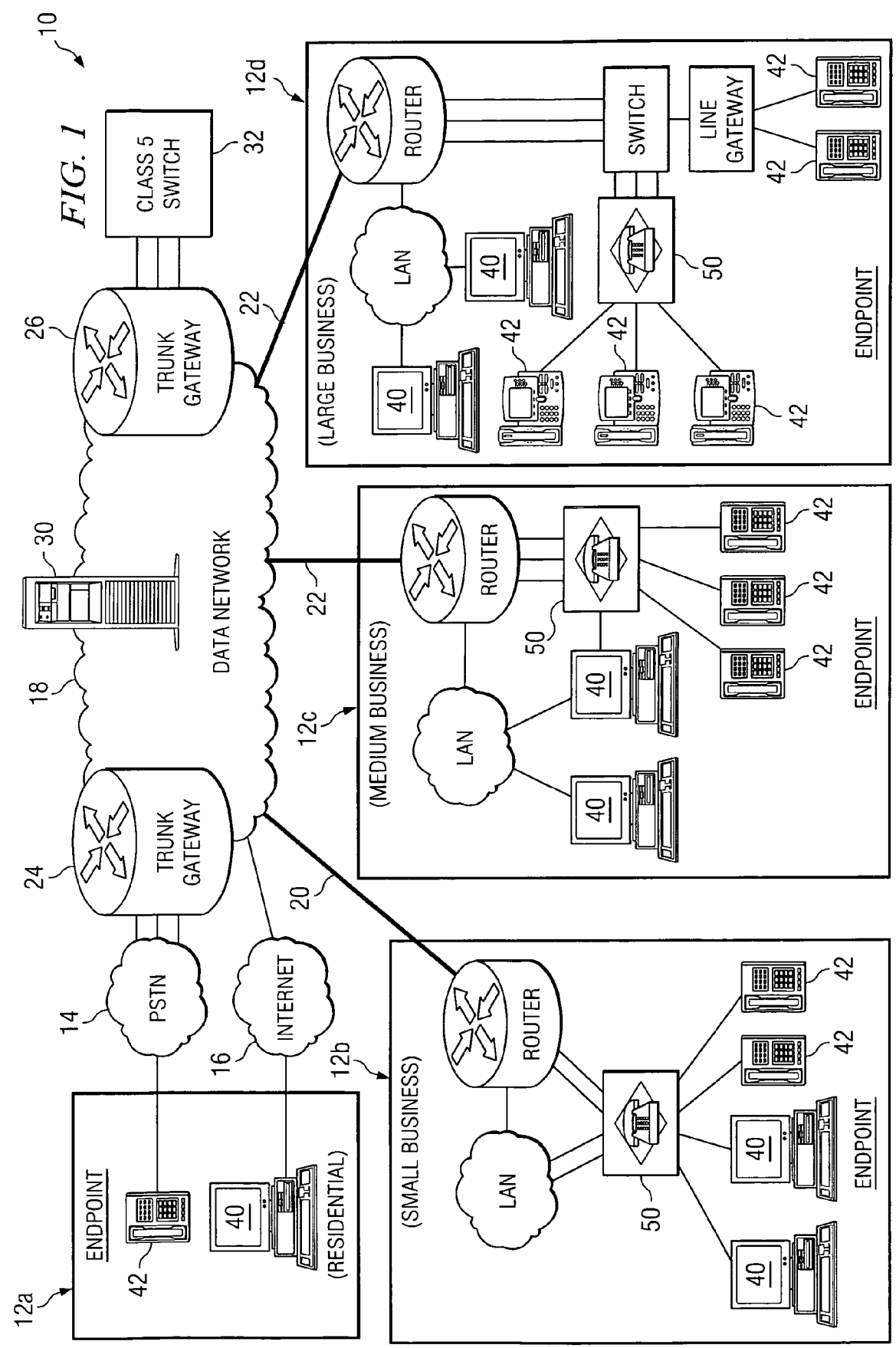
FIG. 1 is a simplified block diagram illustrating a communication system that may implement a presence based eCamp-On™ feature in accordance with one embodiment of the present invention.

FIG. 1 is a simplified block diagram of a communication system 10 for communicating, receiving, and transmitting data in a communications environment (e.g. session initiation protocol (SIP) environment). Communication system 10 includes multiple branch offices (or endpoints) 12a-12d, a public switched telephone network (PSTN) 14, an Internet 16, a data network 18, a broadband access link 20, and a number of additional links 22 (which may include, for example, a digital subscriber line (DSL) link, a T1 link, a fiber optic link, and a wireless link). Communication system 10 also includes a set of trunk gateways 24 and 26, a 3rd-party application server 30, and a Class-5 switch 32.

Endpoint 12a represents a residential location, which consists of a computer 40 and several telephones 42. Telephones 42 may be an Internet protocol (IP) telephone or a standard telephone that is operable to interface with computer 40 such that one or more capabilities of SIP are enabled through telephone 42. Accordingly, two types of telephones are illustrated in FIG. 1. Note that any of the phones could be connected to the network via wire, wireless, cellular, satellite link, or any other suitable means. Branch office 12b represents a small business entity (e.g., a small branch office), which consists of a local area network (LAN), a router, several computers 40, and several telephones 42. Branch office 12c represents a medium business entity (e.g., a medium branch office), which consists of a LAN, router, a private branch exchange (PBX) or key system, several computers 40, and several telephones 42. Branch office 12d is a large business entity (e.g., a large branch office), which consists of a LAN, a router, a switch, a line gateway, several computers 40, and several telephones 42. Note that branch offices 12b, 12c, and 12d, which are inclusive of suitable "endpoints," each include a communications platform 50, which is operable to communicate with any number of devices (e.g. telephones 42 and/or computer 40). In one embodiment, communications platform 50 is a Call Manager element, which is manufactured by Cisco Systems, Inc. of San Jose, Calif. The Call Manager element may be SIP-enabled in a particular embodiment. In other embodiments, communications platform 50 is any suitable unit that is operable to interface with end-user devices (e.g. telephone 42, computer 40, etc.).

In accordance with the teachings of the present invention, communication system 10 offers a new mechanism for a caller, who eCamps-on another user, to transfer the eCamp-On™ function to another end-user device on which he has established his presence. Such a technology service allows for an effective call delivery for both participants (i.e. a called party and a calling party). Specifically, communication system 10 provides a mechanism for assuring that the called party can direct a return call to an optimal calling party destination.

Figure 2:
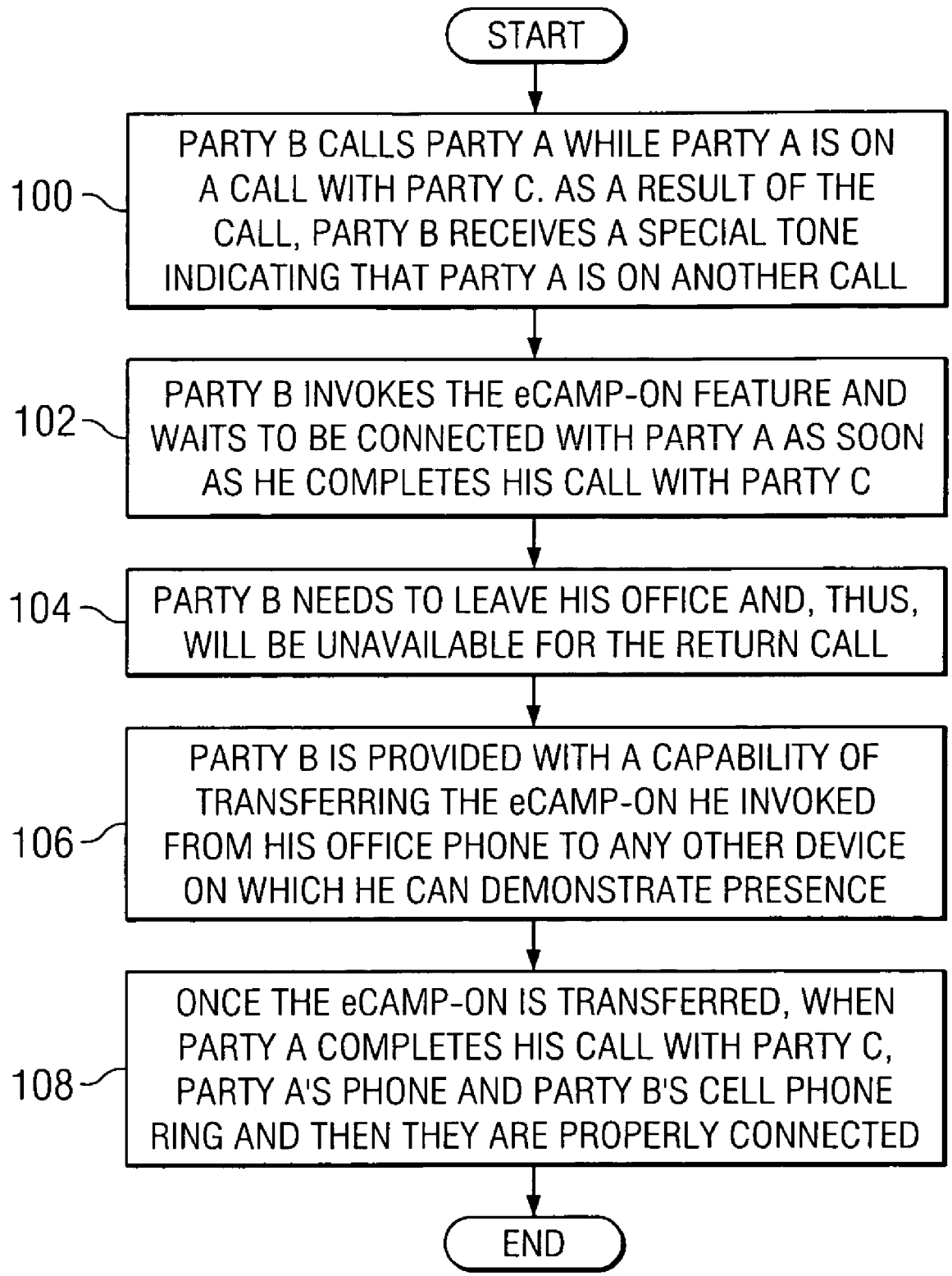
FIG. 2 is a simplified block diagram illustrating an example operational flow of a presence based eCamp-On™ scenario.

Consider an example illustrated by FIG. 2, which is referenced briefly here before returning to the discussion of the infrastructure of FIG. 1. The example of FIG. 2 begins at step 100, where party B calls party A while party A is on a call with party C. As a result of the call, party B receives a special tone indicating that party A is on another call (or otherwise unavailable). Party B invokes the eCamp-On™ feature and waits to be connected with party A as soon as he completes his call with party C, as illustrated by step 102. Now assume that party B needs to leave his office at step 104. Some systems provide party B with an option to revoke the eCamp-On™ that was previously invoked. If party B steps out of his office without canceling the eCamp-On™, when party A completes his call with party C, the phones of parties A and B will ring. Party A will pick up the handset and hear the ring-no-answer of caller B's phone.

In accordance with features of the present invention, party B is provided with a capability of transferring the eCamp-On™ he invoked from his office phone to any other device on which he can demonstrate presence. For example, caller B can establish his presence on his cell phone and use it to transfer the eCamp-On™ he invokes from his office phone to his cell phone. This is illustrated by step 106. Once the eCamp-On™ is transferred, when party A completes his call with party C, party A's phone and party B's cell phone ring and then they are properly connected at step 108. In accordance with one embodiment, party B can manually specify the destination device to which the eCamp-On™ should be transferred. In another embodiment, the system automatically transfers the eCamp-On™ to the device on which party B had last established his presence.

Thus, communication system 10 offers a new presence based eCamp-On™ technology service that allows for an effective contact and establishment of an optimal call session for a calling party. Note that the entity or individual that has initiated the call has a "persona," as defined by the communications platform. The persona represents an aggregation of the various devices and/or logical addresses that can be used by a person to communicate with another individual. For example, the persona of an employee named Selma could be represented by her business phone number, her cell phone number, her fully qualified domain name, her e-mail address, and/or the IP address port of her Instant Messaging application on her personal computer. Any number of these variables (or others) could be used to reflect Selma's persona.

Utilizing this concept of persona, communication system 10 can be expanded or leveraged to offer the ability to subscribe to an individual through several types of communication modes (i.e. telephone, e-mail, video phone, Instant Messaging, etc.). Such an option allows a response to the eCamp-On™ function to account for a preferred communication device. For example, if a persona (e.g. Selma) is camped onto by her supervisor (e.g. John), John has the freedom to leave the office or to change devices while maintaining his eCamp of Selma. Thus, John is not confined in his movements, nor is John inhibited in his technology of choice. The potential applications of such a persona capability are virtually boundless and are fully detailed below.

The presence based eCamp-On™ feature is flexible and user-configurable and, thus, can accommodate any number of scenarios. In another example, John could configure his own presence information such that, after 5:00 PM, he can be contacted only through his cellular telephone. This designation could be made at any time. In even more specific arrangements, John could then configure his preferred connectivity to his home phone after 6:30 PM (e.g. in cases where John was commuting from work to his house between 5:00 PM to 6:30 PM).

Note also that communication system 10 can accommodate any number of preferences or elections of a given end user (e.g. a preferred mode of communication [IM, video, etc.] for specific individuals). For example, the eCamp-On™ feature can allow an end user to elect that a given camped-on person (e.g. the end user's wife) should achieve connectivity through his cellular telephone, but that his supervisor may not be afforded this same ability (e.g. his supervisor should only reach him through a business phone). In another example, the wife may be able to communicate with the end user using an IP telephone, but the supervisor can only communicate with the end user using IM. This could be executed by leveraging existing preferences or policies with a presence status. Any suitable preference or policy may be readily accommodated and accounted for by the tendered architecture.

Additionally, it should be noted that communication system 10 can readily account for communication modality changes. For example, the eCamp-On™ feature may be invoked while using a first modality (or medium). The end user may then opt to relocate, whereby the communication channel that is already established would utilize a different communication modality. Consider a more specific example in which party A eCamps-On™ party B using a video phone. When party A is forced to leave the office, the architecture of communication system 10 (e.g. communications platform 50) is intelligent enough to recognize and to establish a proper voice only connection between party A and party B. This is because party A does not have video capabilities on his cellular telephone, which party A is confined to use while commuting from work. In another scenario, party A can eCamp-On™ on party B using his IP phone. However, when party A leaves his cubicle in order to attend a conference meeting with his sales team, party A will only be available through IM. As a result, when party B ends his phone call and the new call is triggered because of the eCamp-On™ feature invocation, the chat/IM window on the computer of party A can be brought up, whereby an IM session is established between party A and party B. Such changes in modalities can readily be accommodated by proffered architecture.

Branch offices 12a-d are SIP-compatible elements that include hardware and/or software that is operable to receive and to transmit data (directly or indirectly) and to implement the presence based eCamp-On™ feature as outlined herein. Note that the term "branch office" and "end point" are interchangeable and, further, the term "endpoint" encompasses a myriad of potential devices and infrastructure that may benefit from the operations of communication system 10. Endpoints may be a personal digital assistant (PDA), a cellular telephone, a standard telephone (which may be coupled to a personal computer) an IP telephone, a personal computer, a laptop computer, a mobile telephone, or any other suitable device or element (or any appropriate combination of these elements) that is operable to receive data or information. Each branch office may also include suitable network equipment and appropriate infrastructure (e.g., switches, routers, LANs, gateways, endpoints, etc.) to facilitate a SIP session. FIG. 1 illustrates only one set of example devices that may be used within communication system 10. The present invention is replete with numerous alternatives that could be used to facilitate the operations of communication system 10.

It should also be noted that the internal structure of branch offices (or endpoints) 12a-d are malleable and can be readily changed, modified, rearranged, or reconfigured in order to achieve their intended operations as they pertain to the presence based eCamp-On™ mode function. As identified supra, software and/or hardware may reside in endpoints or branch offices 12a-d in order to achieve the teachings of the presence based eCamp-On™ feature of the present invention. Specifically, such items may be included in (or loaded into) any targeted communications platform (e.g. communications platform 50, telephones 42 and/or computers 40). (Note that, in certain embodiments, communications platform(s) 50 may execute the requisite operations of the presence based eCamp-On™ feature without assistance from any other element.) However, due to their flexibility, these elements (i.e. telephones 42, computers 40, and communications platform 50) may alternatively be equipped with (or include or be coupled to) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of the elements included within endpoints or branch offices 12a-d in the context of communication system 10 and, accordingly, it should be construed as such.

For purposes of teaching and discussion, it is useful to provide some overview as to the way in which the following invention operates in a SIP environment. The following foundational information may be viewed as a basis from which the present invention may be properly explained. Such information is offered earnestly for purposes of explanation only and, accordingly, should not be construed in any way to limit the broad scope of the present invention and its potential applications. Though the current invention is illustrated in the SIP environment, it is not limited to SIP and can actually apply to any other VoIP, as well as TDM implementation.

There are many applications that require the creation and management of a session, where a session is considered an exchange of data between an association of participants. The implementation of these applications is complicated by the practices of participants: users may move between endpoints, they may be addressable by multiple names, and they may communicate in several different media: in many cases simultaneously. Certain protocols have been developed to carry various forms of real-time multimedia session data such as voice, video, or text messages.

The SIP features of communication system 10 work in concert with these protocols by enabling endpoints (generally referred to as "user agents") to discover one another and to agree on a characterization of a session they would like to share. For locating prospective session participants, and for other functions, SIP enables the creation of an infrastructure of network hosts (generally referred to as proxy servers) to which user agents can send registrations, invitations to sessions, and other requests. SIP is an agile, general-purpose tool for creating, modifying, and terminating sessions. SIP works independently of underlying transport protocols and without dependency on the type of session that is being established.

SIP is an application-layer control protocol that can establish, modify, and terminate multimedia sessions (conferences) such as Internet telephony calls. SIP can also invite participants to already existing sessions, such as multicast conferences. Media can be added to (and removed from) an existing session. SIP transparently supports name mapping and redirection services, which supports personal mobility. End users can maintain a single externally visible identifier regardless of their network location.

SIP supports five facets of establishing and terminating multimedia communications: 1) user location: determination of the end system to be used for communication; 2) user availability: determination of the willingness of the called party to engage in communications; 3) user capabilities: determination of the media and media parameters to be used; 4) session setup: "ringing" establishment of session parameters at both called and calling party locations; and 5) session management: including transfer and termination of sessions, modifying session parameters, and invoking services.

A standard SIP platform does not provide services. Rather, SIP provides primitives that can be used to implement different services. For example, SIP can locate a user and deliver an opaque object to his current location. If this primitive is used to deliver a session description written in SDP, for instance, the endpoints can agree on the parameters of a session. If the same primitive is used to deliver a photo of the caller as well as the session description, a "caller ID" service can be easily implemented.

FIG. 3 is a simplified block diagram of an example operational flow of the communication system of FIG. 1. FIG. 3 includes an IP telephone 86, which includes a display 90 that includes a presence data element 92. In addition, IP telephone 86 includes an eCamp-On™ feature provided on a button that, when depressed, can initiate the eCamp-On™ feature as outlined herein.

FIG. 3 illustrates a case where John seeks to talk to Penelope: both of whom are illustrated. Through the SIP architecture and the eCamp-On™ feature, John sees the Penelope is unavailable. Rather than leave a voice-mail message or an Instant Message, John elects to camp onto her extension. Thus, John is afforded the opportunity to generate a subscription to this extension. A presence server (e.g. provided within or coupled to communications platform 50) could then aggregate whether these two individuals can correspond using IM or whether Penelope is out of the office today, etc. The presence state may be aggregated from all devices belonging to the call originator. Virtually any condition associated with a called party can be identified and, further, used to assist the calling party in his endeavors.

The eCamp-On™ feature may also inform Penelope that John has camped onto her extension. This could be beneficial in cases where John is eager to speak with Penelope and Penelope is being occupied by something trivial. For example, John may be having a last-minute work crisis that could be easily resolved by Penelope. Penelope could simply be having a phone conversation with her mother about an upcoming birthday party. Thus, without knowing anything about John's quandary, Penelope would continue the call with her mother. However, using the eCamp-On™ feature, Penelope could see that John is anxious to speak with her and immediately disconnect with her mother and then receive John's call.

In this example, John is suddenly called away from his desk. Recognizing that Penelope will be calling him back shortly via the eCamp-On™ 4 function, John configures his presence data such that it reflects his current availability is only on a cell phone. John is therefore unencumbered in his activities, as he continues to await Penelope's call. This change in device is reflected by the shaded portion of the presence data of FIG. 3.

The presence based eCamp-On™ feature minimizes delays and provides an optimal strategy for contacting the calling endpoint. In some embodiments of the present invention, any number of pop-up messages can be used to guide or to direct the originally called party to the best possible solution for contacting the person who has executed an eCamp-on. For example, after John eCamps-On Penelope, a pop-up message for Penelope could offer her the option of contacting John through Instant Messaging. Through the presence based eCamp-On™ feature, Penelope could recognize that John is using his laptop keypad or a personal computer. In order to effectively communicate with John, Penelope could contact John using Instant Messaging, which could easily ping John in his current environment. In this scenario, a simple Instant Messaging option could be offered to Penelope such that, when selected, it could trigger the Instant Messaging capability directly from Penelope's endpoint. Thus, the presence based eCamp-On™ feature can display any number of media options from which Penelope can make her desired selection. In still other scenarios, Penelope may recognize other presence information associated with John's wireless capabilities. Hence, Penelope could see that John's mobile telephone is turned ON and that John's mobile telephone is not being used. Penelope could then just latch onto that connection and contact John on his mobile telephone to complete the return call, which was spawned by the eCamp-On™ function.

Note that the offered communication system offers an interactive approach or a "live" protocol for associated participants. Also, a higher number of successful calls are completed using the eCamp-On™ feature, which vastly improves efficiency parameters. Moreover, such a protocol may be performed with minimal individual effort from the either party, as the eCamp-On™ feature may even be performed autonomously.

Note also that several presence based eCamp-On™ options can be provided to a given end user. In the case of FIG. 3, a hardware button can be invoked to trigger this functionality. In other cases, a software implementation could be used such that a menu scenario is offered. This software arrangement could guide the end user to utilize a presence based eCamp-On™, as could be reflected by a prompting message on Penelope's screen. In still other scenarios, a hybrid function could be provided that changes based on state information. All such possibilities are clearly within the broad scope of the present invention.

It is important to note that the stages and steps in FIGS. 2 through 3 illustrate only some of the possible scenarios that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with executing presence based eCamp-On™ functions.

Although the present invention has been described in detail with reference to particular embodiments, it should be understood that various other changes, substitutions, and alterations may be made hereto without departing from the spirit and scope of the present invention. The illustrated network architecture of FIG. 1 has only been offered for purposes of example and teaching. Suitable alternatives and substitutions are envisioned and contemplated by the present invention: such alternatives and substitutions being clearly within the broad scope of communication system 10. For example, the use of the LAN could easily be replaced by a virtual private network (VPN), a metropolitan area network (MAN), a wide area network (WAN), a wireless LAN (WLAN), or any other element that facilitates data propagation for endpoints or branch offices 12a-d. Using analogous reasoning, the routers and switches illustrated by FIG. 1 may be supplanted by bridges, hubs, gateways, or any other suitable devices that are conducive to network communications. In addition, while the foregoing discussion has focused on SIP, any other suitable session protocol may benefit from the teachings provided herein. The present invention is not confined to the SIP platform or its proscriptions.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. A method for facilitating a data session in a communications environment, comprising:
   initiating, by a first endpoint used by a first party, a call that is intended for a second endpoint;
   invoking, by the first endpoint, a camp-on feature in response to the second endpoint being unavailable, wherein the camp-on feature initiates a new call to the second endpoint once the second endpoint is available; and
   leveraging presence data associated with the first endpoint in order to make the new call by:
      presenting the presence data to the second endpoint, the presence data indicating one or more options for contacting the first party;
      receiving a selection of an option from the second endpoint; and
      establishing the new call according to the selected option.

2. The method of claim 1, wherein the second endpoint is operable to recognize that the first endpoint is seeking to contact the second endpoint in order to execute the new call.

3. The method of claim 1, wherein the presence data is user configurable, and wherein the presence data can be collected and utilized autonomously.

4. The method of claim 3, wherein the presence data includes scheduling information associated with an end user of the first endpoint.

5. The method of claim 1, wherein the presence data prescribes different protocols, for contacting the first endpoint, for different individuals.

6. The method of claim 1, wherein the first endpoint can change modalities such that when the new call is placed, the change in modalities is recognized in order for an end user of the first endpoint to receive information in a proper communication medium.

7. The method of claim 1, wherein the presence data is associated with a selected one of a group of devices, the group consisting of:
   a) a personal computer;
   b) a laptop;
   c) a personal digital assistant;
   d) an Internet protocol (IP) telephone;
   e) a standard telephone; and
   f) a mobile telephone.

8. The method of claim 1, further comprising:
   prompting the second endpoint to utilize the presence data in order to complete the new call.

9. The method of claim 1, wherein utilizing a presence based camp-on feature is invoked via a button provided at the second endpoint.

10. The method of claim 1, wherein utilizing a presence based camp-on feature is invoked via a soft button using software that comprises a menu.

11. The method of claim 1, the one or more options comprising one or more devices through which the first party can be reached.

12. The method of claim 1, the one or more options comprising one or more media options through which the first party can be reached.

13. A method for facilitating a data session in a communications environment, comprising:
   executing a camp-on feature, which was triggered by a first endpoint used by a first party, in response to a second endpoint being unavailable, wherein the camp-on feature initiates a new call to the and second endpoint once the second endpoint is available; and
   utilizing presence data associated with the first endpoint in order to coordinate the new call by:
      presenting the presence data to the second endpoint, the presence data indicating one or more options for contacting the first party;
      receiving a selection of an option from the second endpoint; and
      establishing the new call according to the selected option.

14. The method of claim 13, further comprising:
   maintaining the presence data, wherein the presence data is user configurable, and wherein the presence data can be collected and utilized autonomously.

15. The method of claim 13, wherein the presence data includes scheduling information associated with an end user of the first endpoint.

16. The method of claim 13, wherein the presence data prescribes different protocols, for contacting the first endpoint, for different individuals.

17. The method of claim 13, wherein the first endpoint can change modalities such that when the new call is placed, the change in modalities is recognized in order for an end user of the first endpoint to receive information in a proper communication medium.

18. The method of claim 13, further comprising:
   prompting the second endpoint to utilize the presence data in order to complete the new call.

19. The method of claim 13, further comprising:
   accessing a presence server in order to gather the presence data associated with either of the endpoints.

20. An apparatus for facilitating a data session in a communications environment, comprising:
   a communications platform operable to:
      execute a camp-on feature, which was triggered by a first endpoint used by a first party, in response to a second endpoint being unavailable, wherein the camp-on feature initiates a new call to the second endpoint once the second endpoint is available,
      utilize presence data associated with the first endpoint in order to coordinate the new call by:
         presenting the presence data to the second endpoint, the presence data indicating one or more options for contacting the first party;
         receiving a selection of an option from the second endpoint; and
         establishing the new call according to the selected option.

21. The apparatus of claim 20, wherein the communications platform is further operable to manage the presence data, and wherein the presence data is user configurable.

22. The apparatus of claim 20, wherein the presence data includes scheduling information associated with an end user of the first endpoint.

23. The apparatus of claim 20, wherein the presence data prescribes different protocols, for contacting the first endpoint, for different individuals.

24. The apparatus of claim 20, wherein the first endpoint can change modalities such that when the new call is placed, the change in modalities is recognized in order for an end user of the first endpoint to receive information in a proper communication medium.

25. The apparatus of claim 20, wherein the communications platform is further operable to prompt the second endpoint to utilize the presence data in order to complete the new call.

26. The apparatus of claim 20, further comprising:
a presence server coupled to the communications platform, wherein the communications platform is operable to access the presence server in order to gather the presence data associated with either of the endpoints.

27. The apparatus of claim 20, the one or more options comprising one or more devices through which the first party can be reached.

28. The apparatus of claim 20, the one or more options comprising one or more media options through which the first party can be reached.

29. A computer readable non-transitory medium storing software for facilitating a data session in a communications environment, the software comprising computer code such that when executed is operable to:
execute a camp-on feature, which was triggered by a first endpoint used by a first party, in response to a second endpoint being unavailable, wherein the camp-on feature initiates a new call to the second endpoint once the second endpoint is available; and
utilize presence data associated with the first endpoint in order to coordinate the new call by:
presenting the presence data to the second endpoint, the presence data indicating one or more options for contacting the first party;
receiving a selection of an option from the second endpoint; and
establishing the new call according to the selected option.

30. The medium of claim 29, wherein the code is further operable to:
maintain the presence data, wherein the presence data is user configurable.

31. The medium of claim 29, wherein the presence data includes scheduling information associated with an end user of the first endpoint.

32. The medium of claim 29, wherein the presence data prescribes different protocols, for contacting the first endpoint, for different individuals.

33. The medium of claim 29, wherein the presence data is collected and utilized autonomously.

34. The medium of claim 29, wherein the code is further operable to:
prompt the second endpoint to utilize the presence data in order to complete the new call.

35. The medium of claim 29, the one or more options comprising one or more devices through which the first party can be reached.

36. The medium of claim 29, the one or more options comprising one or more media options through which the first party can be reached.

37. A system for facilitating a data session in a communications environment, comprising:
means for executing a camp-on feature, which was triggered by a first endpoint used by a first party, in response to a second endpoint being unavailable, wherein the camp-on feature initiates a new call to the second endpoint once the second endpoint is available; and
means for utilizing presence data associated with the first endpoint in order to coordinate the new call by:
presenting the presence data to the second endpoint, the presence data indicating one or more options for contacting the first party;
receiving a selection of an option from the second endpoint; and
establishing the new call according to the selected option.

38. The system of claim 37, further comprising:
means for maintaining the presence data, wherein the presence data is user configurable.

39. The system of claim 37, wherein the presence data includes scheduling information associated with an end user of the first endpoint.

40. The system of claim 37, wherein the presence data prescribes different protocols, for contacting the first endpoint, for different individuals.

41. The system of claim 37, wherein the presence data is collected and utilized autonomously.

42. The system of claim 37, further comprising:
means for prompting the second endpoint to utilize the presence data in order to complete the new call.

43. The system of claim 37, further comprising:
means for accessing a presence server in order to gather the presence data associated with either of the endpoints.

44. The system of claim 37, the one or more options comprising one or more devices through which the first party can be reached.

45. The system of claim 37, the one or more options comprising one or more media options through which the first party can be reached.

* * * * *